(12) United States Patent
Hoeller et al.

(10) Patent No.: US 9,879,982 B2
(45) Date of Patent: Jan. 30, 2018

(54) METHOD AND ARRANGEMENT FOR MEASURING INTERNAL THREADS OF A WORKPIECE WITH AN OPTICAL SENSOR

(71) Applicant: Carl Zeiss Industrielle Messtechnik GmbH, Oberkochen (DE)

(72) Inventors: Frank Hoeller, Aalen (DE); Bernd Spruck, Moegglingen (DE)

(73) Assignee: Carl Zeiss Industrielle Messtechnik GmbH, Oberkochen (DE)

( * ) Notice: Subject to any disclaimer, the term of this patent is extended or adjusted under 35 U.S.C. 154(b) by 143 days.

(21) Appl. No.: 15/068,439

(22) Filed: Mar. 11, 2016

(65) Prior Publication Data

US 2016/0195385 A1 Jul. 7, 2016

Related U.S. Application Data

(63) Continuation of application No. PCT/EP2013/068969, filed on Sep. 13, 2013.

(51) Int. Cl.
*G01B 11/24* (2006.01)
*G01J 1/44* (2006.01)

(52) U.S. Cl.
CPC ............ *G01B 11/2425* (2013.01); *G01J 1/44* (2013.01); *G01J 2001/448* (2013.01)

(58) Field of Classification Search
CPC .... G01B 11/2425; G01J 1/44; G01J 2001/448

USPC ...................................................... 250/208.1
See application file for complete search history.

(56) References Cited

U.S. PATENT DOCUMENTS

| | | | | |
|---|---|---|---|---|
| 5,521,707 A | * | 5/1996 | Castore | G01B 11/2425 356/394 |
| 2011/0164244 A1 | * | 7/2011 | Honda | G01B 5/163 356/72 |
| 2012/0314223 A1 | | 12/2012 | Bondurant et al. | |

OTHER PUBLICATIONS

International Search Report dated May 28, 2014 in international patent application PCT/EP2013/068969 on which the claim of priority is based.

(Continued)

*Primary Examiner* — Seung C Sohn
(74) *Attorney, Agent, or Firm* — Walter Ottesen, P.A.

(57) ABSTRACT

The invention is directed to a method for measuring an internal thread of a workpiece with a coordinate measuring apparatus and a CCD or CMOS sensor. The sensor records at least two images of a section of the internal thread and the recording conditions for the two images are modified. The data from these two recorded images are used to establish the position, orientation, core diameter and/or the pitch of the internal thread. The invention is also directed to an arrangement for measuring an internal thread of a workpiece and includes a coordinate measuring apparatus and the CCD or CMOS sensor in accordance with the above method.

12 Claims, 7 Drawing Sheets

(56) References Cited

OTHER PUBLICATIONS

Translation of international preliminary report on patentability and written opinion dated Mar. 24, 2016 in international patent application PCT/EP2013/068969 on which the claim of priority is based.
Perng, D. et al, "A novel internal thread defect auto-inspection system", Int J Adv Manuf Technol (2010) 47: pp. 731 to 743, Springer-Verlag London Limited.
Zhang, H. et al, "In-process inspection of internal threads of machined automotive parts", Optical Inspection and Metrology for Non-Optics Industries, edited by Peisen S. Huang et al, Proc. of SPIE vol. 7432, 74320D, 2009, pp. 74320D-1 to 74320D-9.

* cited by examiner

FIG.4
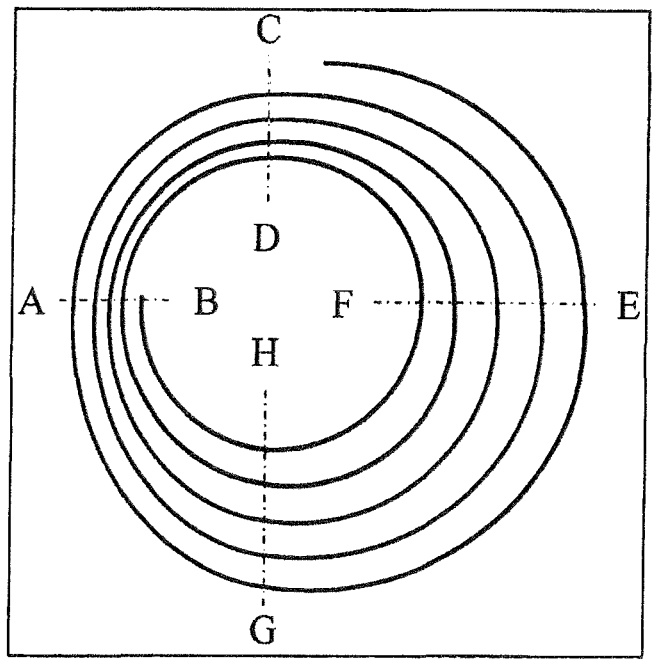
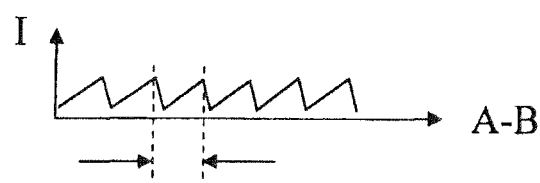
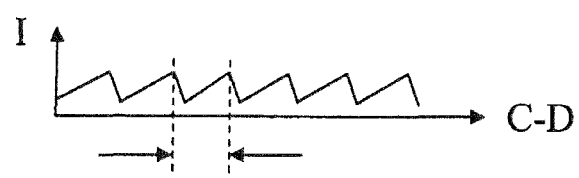
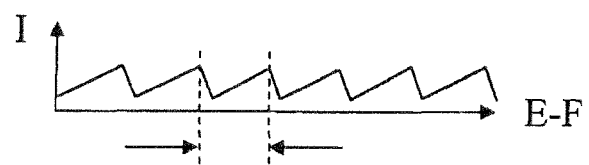
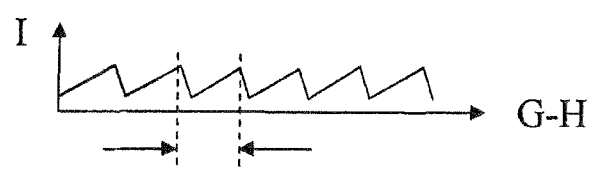

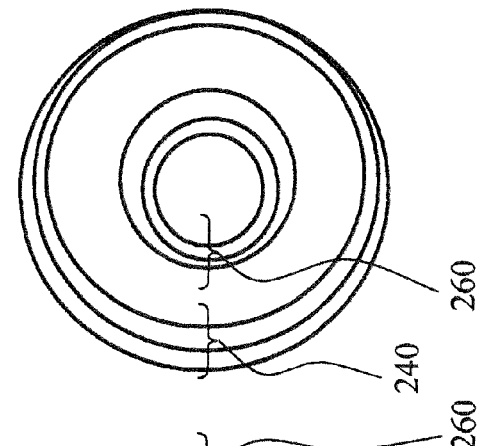
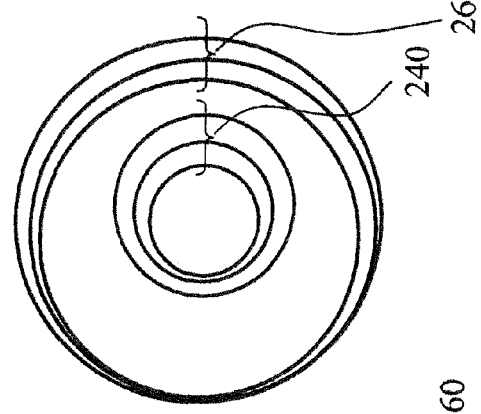
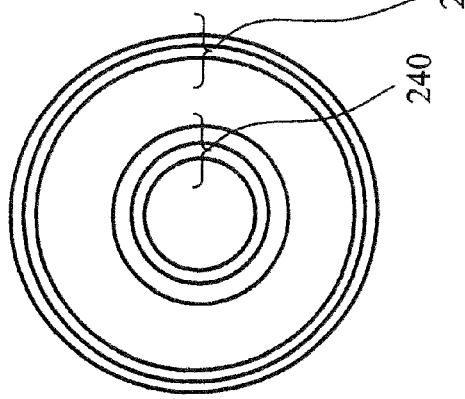
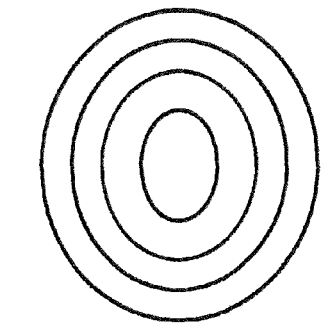
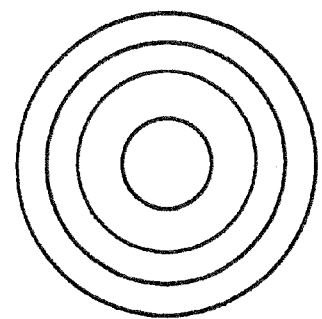
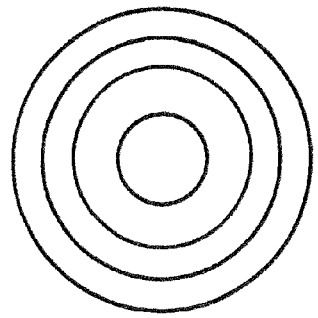
FIG. 5A  FIG. 5B  FIG. 5C
FIG. 6A  FIG. 6B  FIG. 6C

METHOD AND ARRANGEMENT FOR MEASURING INTERNAL THREADS OF A WORKPIECE WITH AN OPTICAL SENSOR

CROSS REFERENCE TO RELATED APPLICATION

This application is a continuation application of international patent application PCT/EP2013/068969, filed Sep. 13, 2013, designating the United States, and the entire content of the above application is incorporated herein by reference.

FIELD OF THE INVENTION

The invention relates to a method and an arrangement for measuring internal threads of a workpiece with a coordinate measuring apparatus with the aid of an optical CCD or CMOS sensor.

BACKGROUND OF THE INVENTION

In addition to bores, internal threads are central inspection characteristics of workpieces, particularly in the drivetrain of motor vehicles. Typically, internal threads are often used at safety and functionally relevant points in the drivetrain, for example in the region of the wheel attachments, cylinder heads, et cetera.

Whereas screws are inspected by means of, for example, the silhouette procedure in respect of the thread dimensions thereof, internal threads are characterized not only by the thread dimensions, but also by the position and orientation of the internal thread relative to the workpiece.

The inspection of thread dimensions of internal threads has until now been carried out by way of occasional checks by means of thread gauges, capacitive sensors or interference-microscopic methods. However, the position and/or the orientation of the internal thread relative to the workpiece is not measured herein and therefore not inspected.

SUMMARY OF THE INVENTION

It is therefore an object of the present invention to specify a method and a device, with the aid of which the simultaneous detection of the thread dimensions, the position and/or the orientation of internal threads is possible.

This object is achieved by a method for measuring an internal thread of a workpiece by means of a coordinate measuring apparatus with the aid of a CCD or CMOS sensor, wherein the CCD or CMOS sensor is used to record at least two images of a portion of the internal thread, wherein the recording conditions for the at least two images are modified and wherein the data from these at least two recorded images are used at least in part to establish the position, the orientation, the core diameter and/or the pitch of the internal thread.

By recording at least two images of a portion of the internal thread under different recording conditions, it is possible to deduce the four measurement variables position, orientation, core diameter and/or pitch of the internal thread from the two-dimensional information within an image in respect of the edge length of the thread edges of the internal thread as a result of the different recording conditions in the at least two different images. Depending on the illumination, the thread edges are visible either as bright lines (luster effect) or as bright/dark boundaries (shadow effect) in the images and are therefore evaluable by means of conventional image processing software in respect of the relative position and the profile thereof in the images. Here, the position of an internal thread is understood to mean the established location of the center of the core diameter at the start of the internal thread in terms of the three spatial coordinates x, y and z relative to the coordinate origin of the coordinate system of the workpiece. By contrast, the orientation of an internal thread is understood to mean the established inclination of the axis of the internal thread, which is formed by the averaged locations of the centers of the established local core diameters along the internal thread, in relation to the three spatial coordinates x, y and z of the coordinate system of the workpiece. The core diameter and the pitch in this case are defined in accordance with DIN 13 and are specified by the arithmetic or Gaussian mean value of the local core diameter and pitches established along the internal thread.

In one embodiment, the position and the orientation and the core diameter and the pitch of the internal thread are established from the data of the at least two recorded images. As a result of the simultaneous evaluation of all of the aforementioned four measurement variables, it is possible to check the observance of both the tolerances in the thread dimensions and the tolerances in the location dimensions of the internal thread within the CAD model of the workpiece.

In another embodiment, one of the images is recorded under central-perspective imaging and the at least one further image is imaged under telecentric imaging. In the case of telecentric imaging, the distance between the thread edges in the image, taking into account the imaging scale of the imaging optics, is identical to the pitch of the thread and independent of the core diameter of the considered internal thread. By contrast, in the case of central-perspective imaging, the distance between the thread edges in the image is dependent on both the pitch and the core diameter of the internal thread, and so the local core diameter and the local pitch of the internal thread at the observed position can be established by comparing the telecentric image and the central-perspective image.

In a further embodiment, the lateral position and/or the orientation of the optical components, which are responsible for the imaging on a CCD or CMOS sensor, is/are modified for recording one of the images in relation to the lateral position and/orientation of the sensor for recording at least one further image. In the case of non-telecentric imaging, the distances between the thread edges are dependent on both the pitch and the distance between the responsible optical components and the portion of the internal thread observed, as already mentioned above. Therefore, the lateral position of the internal thread in relation to the responsible optical components and therefore, in the case of a given calibration, in relation to the coordinate system of the workpiece can be established in addition to the pitch from two different lateral positions when evaluating the images. Accordingly, the distances between the thread edges are modified due to an inclination of the optical axis of the components responsible for the imaging in the case of non-telecentric imaging, and so it is possible to establish the orientation of the internal thread in relation to the coordinate system of the workpiece.

It is understood that the aforementioned measures: change from central-perspective imaging to telecentric imaging, change in the lateral position and change in the orientation for recording the at least two images are interchangeable and/or combinable as desired in order to establish the aforementioned measurement variables of an internal thread.

In one embodiment, for the purposes of recording the portion of the internal thread, the latter is illuminated by means of an illumination and one of the images is recorded under a first illumination angle which deviates from a further illumination angle when recording a further image. As a result of this, it is possible to generate different shadowing effects of the thread edges in the images for different portions of the internal thread. Within the scope of this application, an illumination is understood to mean any type of device able to illuminate the surface of the internal thread, even if only in part. Therefore, this comprises both simple light sources, such as light-emitting diodes or LED chips, and complicated illumination systems with, for example, micromirror arrangements. Within the scope of this application, the illumination angle of an illumination is understood to mean the mean illumination angle of the illumination light on an imagined internal cylinder of the internal thread in the portion to be observed, along a cut plane comprising the axis of the internal thread. Here, the imagined internal cylinder is formed by the thread edges of the internal thread and hence the core diameter of the internal thread constitutes the diameter of the imagined internal cylinder.

In a further embodiment, the pitch diameter of the internal thread is additionally established from the data of the at least two recorded images. By generating different shadow effects, it is possible to detect the thread profile between the thread edges portion-by-portion, as a result of which it is also possible to detect the pitch diameter of the internal thread according to DIN 13 using the aforementioned method.

Moreover, the object of the present invention is also solved by a device for measuring an internal thread of a workpiece by means of a coordinate measuring apparatus with the aid of a CCD or CMOS sensor in accordance with one of the aforementioned methods, comprising an objective and an optical deflection element, wherein the optical deflection element is configured in such a way that it can be inserted into the internal thread and guided therealong, wherein the objective, together with the optical deflection element, ensures an imaging of a portion of the internal thread on the CCD or CMOS sensor, and wherein the objective can change the perspective for recording at least two images of the portion of the internal thread by means of the CCD or CMOS sensor. By changing the perspective for recording at least two images, it is possible to establish the position, the orientation, the core diameter and/or the pitch of the internal thread. Within the scope of this application, an objective which can change the perspective is understood to mean either an objective which can change the perspective by displacing individual lenses, lens groups or stops along the optical axis or an objective which consists of separate optical components, wherein different components are used for different perspectives. By way of example, an objective can consist of a turret with different optical components which, depending on the desired perspective, are pivoted into the optical beam. For the purposes of the change in perspective, it is likewise possible for a stop to be introduced into the beam path of an objective or for a present stop to be removed from the latter.

In one embodiment, one of the images is recorded under central-perspective imaging of the objective and the at least one further image is recorded under telecentric imaging of the objective. The advantages of changing between telecentric imaging and central-perspective imaging were already explained in more detail above.

In another embodiment, the device comprises an illumination, wherein, for the purposes of recording the at least two images of the portion of the internal thread, the illumination can change the illumination angle with which the illumination light is incident on the portion of the internal thread to be observed. The advantages of a different shadow effect on the additional establishment of the pitch diameter were likewise already explained in more detail above.

In a further embodiment, the illumination comprises at least one light source in the vicinity of the objective, wherein the at least one light source can change the lateral position and/or the orientation relative to the objective for setting different illumination angles of the portion of the internal thread to be observed. By virtue of modifying the position and/or the inclination of the light source, it is possible to generate different illumination angles and therefore different shadow effects.

In one embodiment, the illumination comprises a plurality of light sources in the vicinity of the objective, wherein different light sources of these aforementioned light sources are used in each case for setting different illumination angles of the portion of the internal thread to be observed. By switching different light sources on and off, it is likewise possible to generate different illumination angles and therefore different shadow effects.

In another embodiment, the illumination comprises a plurality of light sources in the vicinity of the deflection element, wherein these light sources are configured in such a way that they can be inserted together with the deflection element into the internal thread to be measured and wherein different light sources of these aforementioned light sources are used in each case for setting different illumination angles of the portion of the internal thread to be observed. By switching different light sources situated within the internal thread on and off, it is additionally or alternatively possible to provide different illumination angles for illuminating the internal thread than with the light sources in the vicinity of the objective, which are situated outside of the internal thread.

BRIEF DESCRIPTION OF THE DRAWINGS

The invention will now be described with reference to the drawings wherein:

FIG. 4 shows a schematic illustration of an image of an internal thread;

FIG. 5A shows a schematic of a central-perspective image of a portion of an internal thread with the aid of a deflection element;

FIG. 5B shows an image in accordance with FIG. 5A in the case of a decentered device;

FIG. 5C shows an image in accordance with FIG. 5A in the case of an inclined device;

FIG. 6A shows a schematic illustration of a telecentric image of a portion of an internal thread with the aid of a deflection element;

FIG. 6B shows an image in accordance with FIG. 6A in the case of a decentered device;

FIG. 6C shows an image in accordance with FIG. 6A in the case of an inclined device;

DESCRIPTION OF THE PREFERRED EMBODIMENTS OF THE INVENTION

Figure 1:
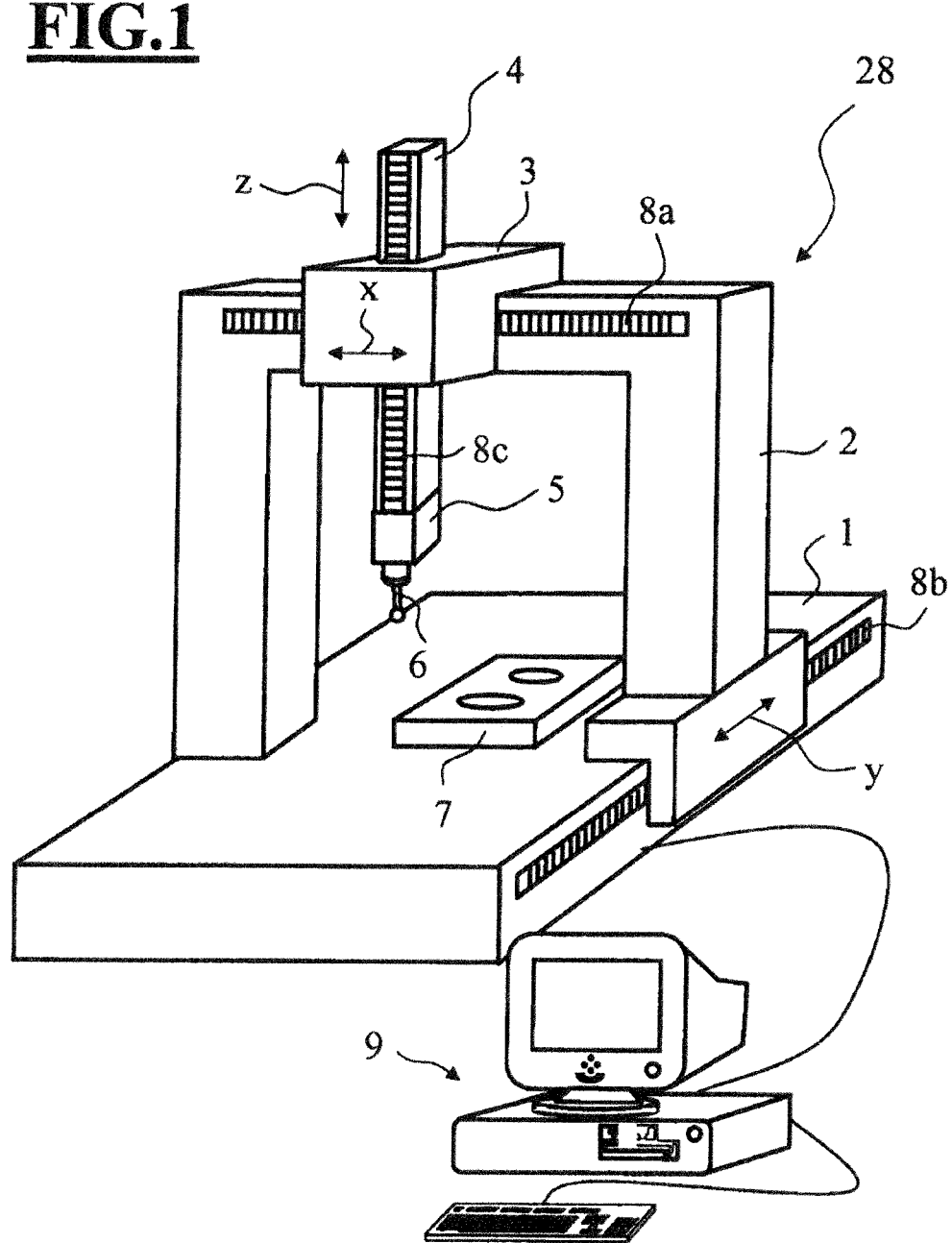
FIG. 1 shows a coordinate measuring apparatus with a portal configuration.

FIG. 1 shows a coordinate measuring apparatus 28 with a so-called portal configuration by way of example. In the area of coordinate measuring technology, bridge- or column-type coordinate measuring apparatuses and multipoint measuring apparatuses, laser tracker coordinate measuring apparatuses, laser tracer coordinate measuring apparatuses, robot coordinate measuring apparatuses or articulated arm coordinate measuring apparatuses are also conventional. It is understood that the present invention can be used in all of these aforementioned coordinate measuring apparatuses and that, therefore, the term coordinate measuring apparatus within the scope of the present application extends to all these aforementioned coordinate measuring apparatuses and to the developments thereof.

The coordinate measuring apparatus 28 has a probe pin or stylus 6, which is fastened in a replaceable manner to a probe head 5 and which can be deflected in relation to the probe head 5 in the three coordinate directions x, y and z. The deflection of the stylus 6 in the three coordinate directions x, y and z is detected by way of the three transducers situated in the probe head 5. The probe head 5, in turn, can be moved in the three coordinate directions x, y and z. To this end, the portal mechanism has a measuring unit 2, which can be displaced in relation to the measurement table 1 in the coordinate direction denoted by the arrow y. The measuring slider 3 is movably guided in the direction denoted by the arrow x along the crossbeam of the measuring unit 2 spanning the measurement table 1. The spindle 4 is in turn movably guided in the direction denoted by the arrow z on the measuring slider 3 such that the probe head 5 can be displaced in the three coordinate directions x, y and z by way of the portal mechanics. A workpiece is now measured in such a way that the stylus 6 probes the workpiece 7 to be measured at predetermined measurement points, wherein the deflection in terms of the three coordinate directions x, y and z of the stylus 6 in relation to the probe head 5 is measured in the probe head 5. Additionally, the current position of the probe head 5 is measured along the three coordinate directions x, y and z at the three incremental scales 8a-8c, which are scanned by optical reader heads. In order to establish a measurement point, the scale measured values 8a-8c are combined by calculation in terms of the correct components with the stylus deflections established by the transducers in the probe head 5 and a measurement point is generated herefrom.

Different styluses are usually required in order now to be able to measure complex workpieces with a complex geometry and the styluses are stored in a cartridge (not depicted here) and can be inserted in an automated manner by way of a changer apparatus at the probe head 5. The different styluses usually have one or more probe shafts, at the ends of which it is possible to fasten a probe body, such as, for example, a probe sphere or a cylinder. By way of example, a horizontal bore will be able to be measured using a horizontally aligned probe shaft, that is, using a so-called laterally arranged stylus 6, while a vertical bore will be able to be measured using a vertically aligned probe shaft.

The measurement process and the drive means of the coordinate measuring apparatus are controlled and the measured values established in the process are recorded and evaluated by a control and evaluation unit 9, which, in an exemplary manner, is realized by a single computer in this embodiment. The control and evaluation unit 9 can additionally be connected to an operating console (not depicted here) by means of which the coordinate measuring apparatus can also be displaced manually in the coordinate directions x, y and z by way of the operating lever and by means of which it is also possible to undertake other functions, such as, for example, a change of stylus or an operation of the measuring program.

Figure 3:
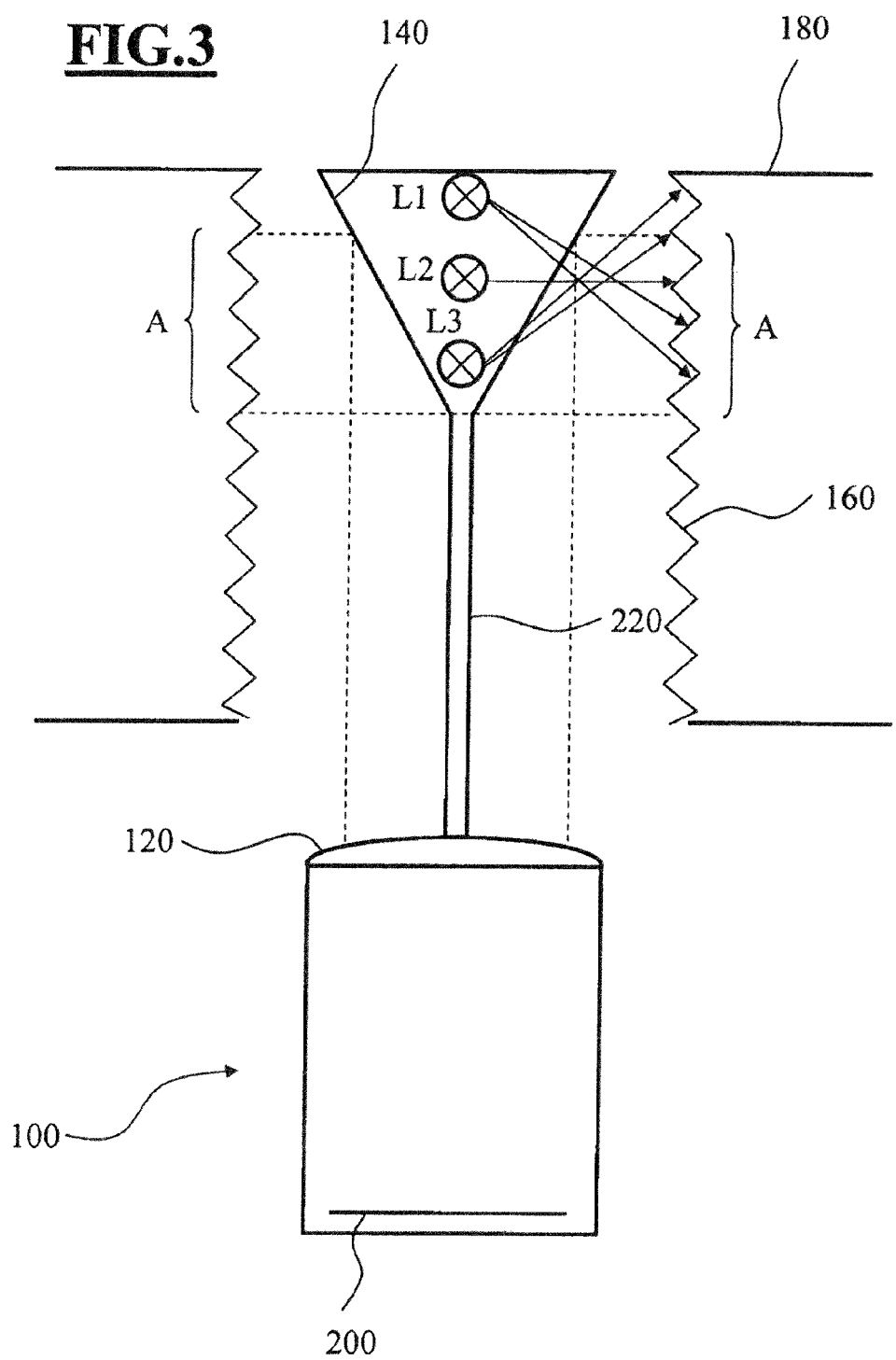
FIG. 3 shows a device according to the invention for measuring internal threads.

As an alternative to a probe head 5, the coordinate measuring apparatus 28 in FIG. 1 can also be equipped with an optical measuring system 100 or a device 100 in accordance with FIG. 3. This device 100 in FIG. 3 includes a CCD or CMOS sensor 200, an objective 120, an optical deflection element 140 and an illumination with the light sources L1 to L3. With the aid of the coordinate measuring apparatus 28, the device 100 can be displaced in a targeted manner to the position of the workpiece 180 to be measured. There recordings of the workpiece 180 are subsequently made with the aid of the CCD or CMOS sensor 200, the objective 120 and the deflection element 140. By applying image processing software to the data records of the recorded images, the coordinates of the observed relevant structures (taking into account the scale measured values 8a-8c of the coordinate measuring apparatus), are either outputted at the control and evaluation unit 9 or provided by the control and evaluation unit for subsequent evaluation steps.

Figure 2:
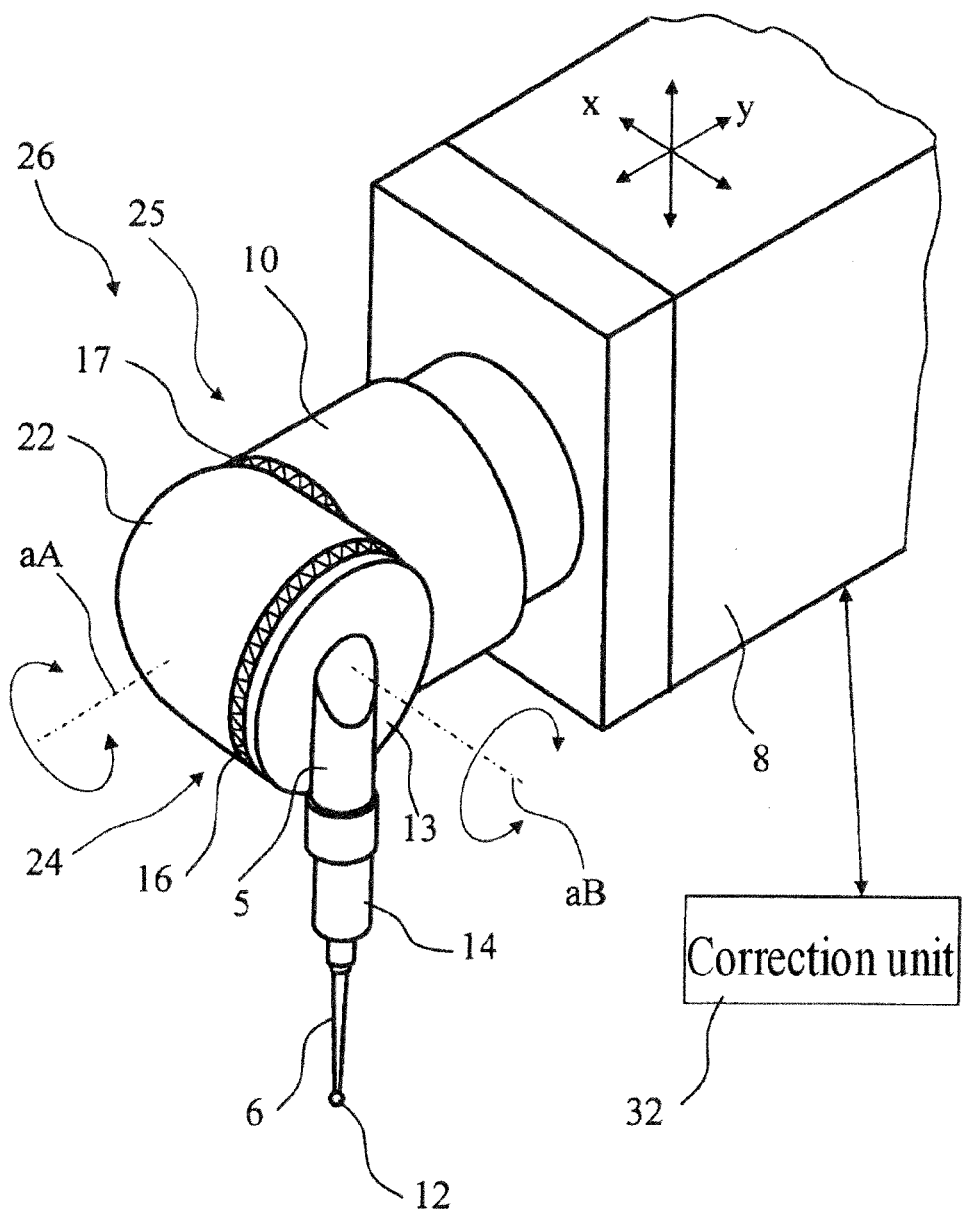
FIG. 2 shows a rotary swivel joint for a coordinate measuring apparatus.

FIG. 2 shows a rotary swivel joint 26 at a horizontally aligned measurement arm 18 of a column-type measuring apparatus not depicted in any more detail. However, in principle, the rotary swivel joint 26 could also be used in a coordinate measuring apparatus 28 of FIG. 1 for orienting a stylus 6 differently in space. In contrast to a portal-type measuring apparatus in FIG. 1, a column-type measuring apparatus has a measuring arm 18, which assumes the function of the spindle 4 of the portal measuring apparatus. Here, a spindle is a special embodiment of a measurement arm for bridge-type or portal-type coordinate measuring apparatuses in the z coordinate direction. The rotary swivel joint 26 depicted in FIG. 2 is referred to as a so-called latching rotary swivel joint and it has two rotary joints (24, 25), which rotatably connect the components 10 and 22, and also the components 22 and 13, wherein the rotary joints (25, 24) define the axes of rotation aA and aB. The rotary swivel joint 26 has so-called Hirth joints or Hirth couplings 16 and 17 for securely latching the set rotary angle. These are pairwise interacting toothed rims that engage in one another. In order to modify the rotary angles of the rotary joints (24, 25), a pneumatic cylinder working against return forces of springs is situated in the interior of the rotary swivel joint 26, by means of which pneumatic cylinder the component 22 can be lifted off the component 10 and the component 13 can be lifted off the component 22. Moreover, an electric motor is provided for each one of the rotary joints, by means of which the rotary angle of the respective rotary joint (24, 25) can be adjusted. After the desired rotary angle is reached, the components 10 and 22, and 22 and 13, lifted out of position are pulled together again by springs when pressure from the pneumatic cylinder is reduced.

As shown, a switching-type probe head 14 is seated on the receptacle of the rotary swivel joint 26. The probe head 14 in turn holds a stylus 6 with a probe sphere 12 in an interchangeable manner, with the probe head 14 triggering an electric signal when the probe sphere 12 contacts a workpiece. The probe head 14 is fastened to the holding plate of component 13 by means of an adapter part 15. It is, for example, also possible to use an optical measuring system or a measuring probe head 5 instead of the switching probe head 14 in accordance with FIG. 1. Moreover, a measuring system 100 according to the invention or a device 100 according to the invention in accordance with FIG. 3 can be used instead of the switching probe head 14. To this end, the probe head 14 or the stylus 6 of the rotary swivel joint 26 in FIG. 2 merely needs to be replaced by a corresponding device 100 from FIG. 3. To this end, appropriate interchange interfaces can be provided at the specified components. By using a rotary swivel joint 26 at a coordinate measuring apparatus 28, it is possible to orient the optical measuring system 100 or the device 100 in accordance with FIG. 3 in different directions at this coordinate measuring apparatus 28 such that, as a result thereof, oblique bores with an internal thread 160 at a workpiece 180 are also made accessible for measurement.

FIG. 3 shows a schematic of a device 100 according to the invention for measuring an internal thread 160 of a workpiece 180 by means of a coordinate measuring apparatus 28 with the aid of a CCD or CMOS sensor 200. The device 100 includes an objective 120 and an optical deflection element 140, wherein the optical deflection element 140 is configured in such a way that it can be inserted into the internal thread 160 and guided therealong, wherein the objective 120, together with the optical deflection element 140, ensures an imaging of a portion A of the internal thread 160 on the CCD or CMOS sensor 200, wherein the objective 120 can change the perspective for recording at least two images of the portion A of the internal thread 160 by means of the CCD or CMOS sensor 200.

The deflection element 140 is at least partly mirrored in FIG. 3 such that the CCD or CMOS sensor 200 detects as an image the section A of the internal thread 160 in a plan view. The deflection element 140 is preferably embodied as a cone and securely connected to the objective by way of the connection element 220. This connection element 220 can have a changeover interface to the objective 120 in this case such that different deflection elements 140 with different configurations or different diameters can be used in conjunction with the objective 120 of the device 100 for measuring internal threads with different core diameters. The deflection element 140 can have various light sources L1, L2 and L3, which illuminate the internal thread 160 through the partly transparent coating of the cone. To this end, the connection element 220 can have electric lines for supplying power to the light sources L1, L2 and L3 of the deflection element 140 and corresponding interfaces. Furthermore, the surface form of the deflection element 140 can also be a so-called free-form face. As a result of this, it is possible, for example, to shift some of the imaging power from the objective into the deflection element, as a result of which substantially more cost-effective objectives can be used in certain circumstances. Moreover, the use of simple separate optical components in a turret can be promoted by a free-form face as deflection element 140. Alternatively, the use of computer-generated holograms (CGH) as a deflection element 140 would also be conceivable.

FIG. 4 shows a schematic illustration of an image of an internal thread 160, as is provided during the observation of the internal thread 160 by eye or by means of the camera, if the view is directed into the internal thread 160 without the deflection element 140. When analyzing such an image on the basis of the sections AB, CD, EF and GH, the intensity profiles along these sections obtained at this time can be evaluated by means of standard software and the distance between two successive thread edges can be established in the respective section. However, the results of these analyses are dependent on the position and orientation of the observer or of the camera relative to the internal thread 160. In the present FIG. 4, the camera is decentered relative to the internal thread and/or inclined in relation to the axis of the internal thread 160.

Therefore, in order to obtain reliable threaded dimensions of an internal thread 160, what is proposed within the scope of the present invention is that the internal thread 160 be observed portion-by-portion in the plan view, that is, in a perpendicular projection in relation to the internal thread wall, by means of at least two images, in which the imaging conditions differ. This procedure is explained in more detail below on the basis of FIGS. 5A to 5C and 6A to 6C. Here, for an improved understanding of the various perspectives, the thread edges in these figures are depicted as concentric circles in the images. A helical thread in the illustrations would have covered the effects of the different perspectives on the location of the thread edges in the figures and made the understanding of the effects more difficult.

FIG. 5A shows such a plan view of the internal thread 160 by means of central-perspective imaging on the CCD or CMOS sensor 200 with the aid of the objective 120 and the deflection element 140. In FIG. 5A, the assumption is made that the deflection element 140 is situated centrally within the internal thread 160 without any inclination or decentering in relation to the internal thread 160. By way of example, the central-perspective imaging can be realized by means of relatively simple optics 120, which are stopped down correspondingly strongly such that they function virtually analogously to a pinhole camera. In such central-perspective imaging, the centrally observed thread appears wider in relation to the threads at the inner edge 260 and outer edge 240 of FIG. 5A or the upper and lower edge of the observed section A in FIG. 3.

FIG. 5B shows a corresponding plan view of the internal thread 160 by means of central-perspective imaging, in which, however, the objective 120, together with the deflection element 140, was decentered to the left in FIG. 3, in the direction of the internal thread, in relation to the position of the objective 120 and the deflection element 140 in the recording in FIG. 5A. As a result of the decentering, the centrally observed thread appears broader on the left-hand side and reduced on the right-hand side in relation to FIG. 5A. Accordingly, the threads at the inner edge 260 and at the outer edge 240 move together on the left and apart on the right.

FIG. 5C shows a corresponding plan view of the internal thread 160 by means of central-perspective imaging, in which, however, the objective 120 was displaced to the right and the deflection element 140 was displaced to the left in FIG. 3, in the direction of the internal thread 160, in relation to the position of the objective 120 and the deflection element 140 in the recording in FIG. 5A, and so this results in a different orientation of the device 100 relative to the internal thread 160 than in FIG. 5A. As a result of this different orientation, the centrally observed thread appears displaced to the right in relation to FIG. 5A, with the width of the central thread not changing as strongly to the right and to the left as in the case of the decentering in accordance with FIG. 5B. In FIG. 5C, the threads at the inner edge 260 and outer edge 240 move to the left in the direction of the inner edge and to the right in the direction of the outer edge compared to FIG. 5A.

FIG. 6A shows a plan view of the internal thread 160 by means of telecentric imaging on the CCD or CMOS sensor 200 with the aid of the objective 120 and the deflection element 140. In FIG. 6A, the assumption is made, like in FIG. 5A, that the deflection element is situated centrally within the internal thread 160 without any inclination or decentering in relation to the internal thread 160. Therefore, the device 100 of FIG. 3 is situated at the same position within the internal thread 160 when recording FIG. 5A and FIG. 6A. The only change is that the perspective in the recording of FIG. 6A is changed to be telecentric. This change in perspective can be brought about by virtue of, for example, use being made of an objective 120 which allows such a change by the displacement of individual lenses, lens groups or stops, or by virtue of a telecentric component being used as a constituent of an objective 120 for the recording in FIG. 6A instead of the simple optical component for the recording in FIG. 5A. In the case of the telecentric perspective, all thread edges of FIG. 3 appear as equidistant circles in a recording, independently of the actual distance between the thread edges and the objective 120. Therefore, in order to evaluate the pitch of the internal thread 160, the mean values of the distances between the thread edges in FIG. 6A can be established on the basis of a plurality of cuts in accordance with FIG. 4 and these therefore result in the mean pitch of the internal thread 160, taking into account the imaging scale of the objective 120.

FIG. 6B shows a corresponding plan view of the internal thread 160 by means of telecentric imaging, in which, however, the objective 120, together with the deflection element 140, was decentered to the left in FIG. 3, in the direction of the internal thread, in relation to the position of the objective 120 and the deflection element 140 in the recording in FIG. 6A. Therefore, the device 100 of FIG. 3 is situated at the same position when recording FIG. 6B as when recording FIG. 5B. Since the threads 160 are imaged in equidistant circles, independently of their distance from the objective 120, in the case of a telecentric perspective, the image of the threads on the CCD or CMOS sensor 200 does not change when decentering the device 100 in the internal thread 160. Therefore, FIG. 6B with a decentered device 100 resembles FIG. 6A with a centered device 100.

FIG. 6C shows a corresponding plan view of the internal thread 160 via telecentric imaging, in which, however, the objective 120 was displaced to the right and the deflection element 140 was displaced to the left in FIG. 3, in the direction of the internal thread 160, in relation to the position of the objective 120 and the deflection element 140 in the recording in FIG. 6A, and so this results in a different orientation of the device 100 relative to the internal thread 160 than in FIG. 6A. The orientation of the device 100 in FIG. 6C corresponds to the orientation of the device 100 in FIG. 5C. As a result of this different orientation, the threads in FIG. 6C appear as equidistant ellipses, with the semi-major axes of the ellipses indicating the direction of inclination and with it being possible to establish the orientation or the angle of inclination of the device 100 relative to the internal thread 160 from the ratio of the two semi-axes of the ellipses. Therefore, it is possible to establish the orientation of the device 100 independently of the position of the device 100 in relation to the internal thread 160 on the basis of the data recorded during the telecentric imaging.

Since both the pitch of the internal thread 160 and the orientation of the device 100 relative to the internal thread 160 can be established on the basis of the data from the telecentric imaging, this information can be used when analyzing the data from the central-perspective imaging in order to establish the position of the device 100 relative to the internal thread 160 and the core diameter of the internal thread 160.

When measuring an internal thread 160 of a workpiece 180, the device 100 is inserted into an internal thread 160 by a coordinate measuring apparatus 28. Here, in general, imaging of the thread edges in the case of a central-perspective recording will be influenced both by decentering of the device 100, as depicted in FIG. 5B, and by an orientation of the device 100, as depicted in FIG. 5C. If the thread pitch and the orientation of the device 100 in relation to the internal thread 160 are established on the basis of the data from a telecentric recording at the same position and orientation of the device 100, this information can be used to remove the effects due to the orientation of the device 100 from the data of the central-perspective recording by calculation in order to subsequently establish the position of the device 100 and the pitch diameter of the internal thread 160 from the resultant data.

It is understood that the invention is based on obtaining mean values for one or more of the four measurement variables position, orientation, pitch and core diameter of the internal thread 160 on the basis of at least two images with different recording conditions. To this end, it is not mandatory for the telecentric and central-perspective recording conditions, mentioned above in relation with FIGS. 5A to 5C and 6A to 6C, to be observed. All that is required is that the recording conditions of the two images differ. Although the use of telecentric imaging and central-perspective imaging has certain advantages since these images are virtually "orthogonal" to one another in the "space" of imaging and it is therefore possible to separate the effects of orientation and position of the device 100, it is possible, in principle, to use any two recording conditions between central-perspective imaging and telecentric imaging, provided that these differ from one another. However, in the case of only small differences in the images, it becomes difficult to establish the aforementioned measurement variables with a sufficient accuracy since the importance of recording errors increases, the less the recording conditions differ from one another. However, the accuracy can in turn be increased by virtue of recording a plurality of recordings, in particular more than 3, under different recording conditions. It is understood that the recording conditions can also be realized by a different position and/or orientation of the device 100 in relation to the internal thread 160. Moreover, it is understood that it is not mandatory for all evaluable measurement variables to always be established simultaneously from the two images. By way of example, it may be the case that the pitch of the internal thread 160 is assumed as being sufficiently well known and the user of the coordinate measuring apparatus 28 with the device 100 is only interested in the position, the orientation and the core diameter of the internal thread 160 in relation to the workpiece 180.

Figure 7:
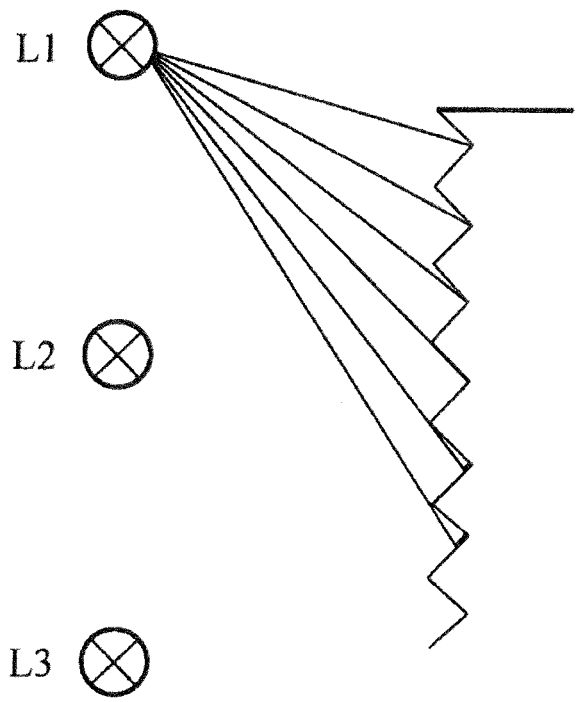
FIGS. 7 and 8 show a schematic of different shadows cast at the internal thread when using different light sources; and, FIG. 9 shows a schematic illustration of a telecentric image of the internal thread with a cast shadow in accordance with FIG. 8.
Figure 8:
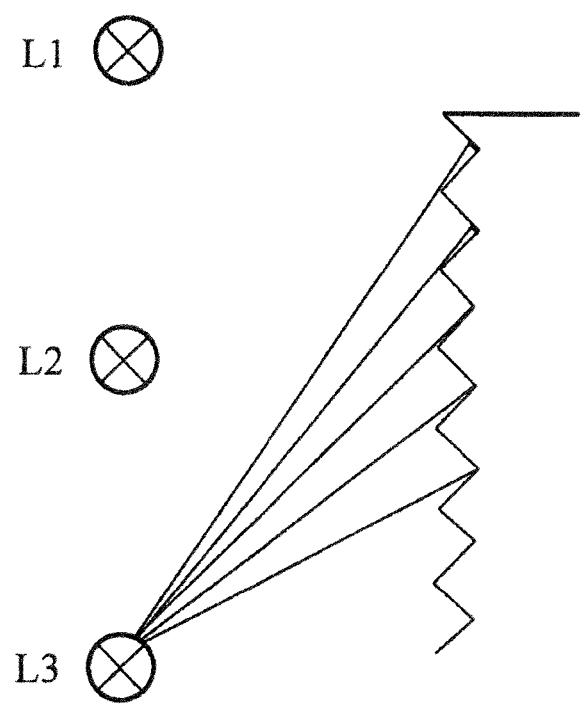

FIGS. 7 and 8 show a magnified illustration of FIG. 3 in the region of the deflection element 140 and of portion A of the internal thread 160. Here, FIG. 7 shows the shadow cast when using the light source L1 of the deflection element 140 and FIG. 8 shows the corresponding shadow cast when using the light source L3 of the deflection element 140. What can clearly be identified in FIG. 7 is that the threads lying directly opposite the light source L1 are illuminated completely, whereas shadows are formed at the distant threads. Consequently, it is the case when recording the threads using the light source L1 that both the thread edges and the ends of the internal thread at the thread wall at the workpiece 180 are difficult to establish as a result of the full illumination of the threads lying opposite one another in the images as these are hardly distinguishable from the thread flanks in terms of the brightness thereof. However, as soon as there is an onset of shadow formation, the thread edge can be clearly identified as a bright/dark boundary.

Figure 9:
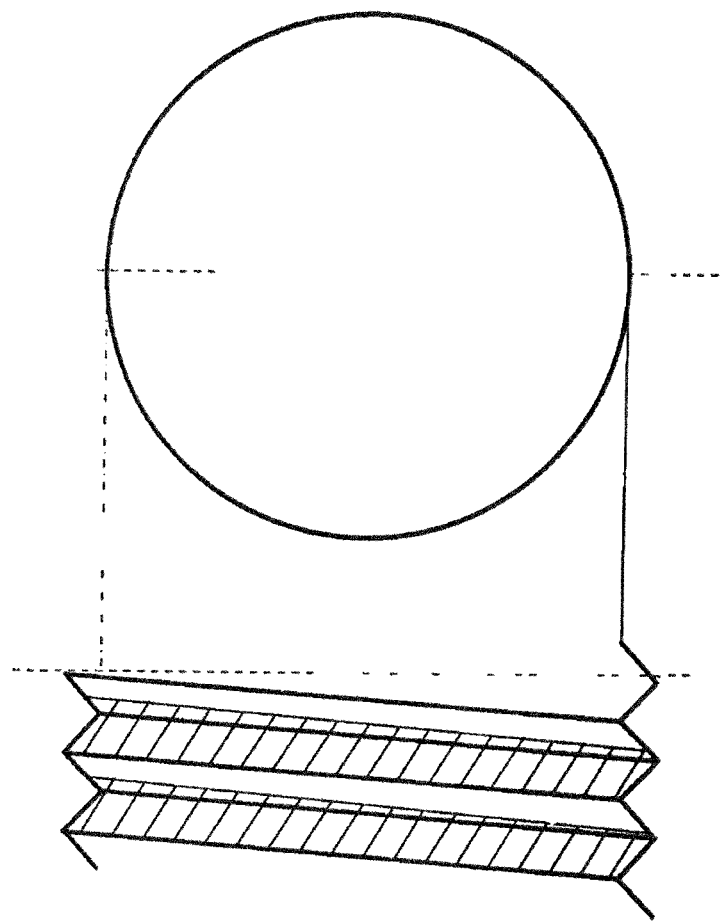

To this end, FIG. 9 shows, in a plan view, the thread of an internal thread 160 in the case of telecentric imaging with the aid of the objective 120 and the deflection element 140, with the thread being illuminated by the light source L3 in accordance with FIG. 8. What can clearly be identified in FIG. 9 is that the thread edges emerge in each case as a bright/dark boundary in FIG. 9 for the two threads in FIG. 8, in which there is an onset of shadow formation. Therefore, different shadow effects can be generated in different regions of portion A by using a plurality of different light sources L1 to L3. The corresponding recordings hereof can then be combined to form a data record in which all thread edges of portion A can be analyzed as clear bright/dark boundaries. Analogously, the recordings can be combined to form a data record in which the ends of the internal thread 160 at the thread wall at the workpiece 180 emerge clearly, and so it is possible to establish the pitch diameter of the internal thread 160 pursuant to DIN 13.

It is understood that the various light sources L1 to L3 can be positioned not only in the vicinity of the deflection element 140. It is also conceivable to position one or more light sources in the vicinity of the objective 120 and to additionally use the deflection element 140 as an illumination mirror for illuminating the internal thread 160 by means of these light sources.

When using a plurality of light sources in the vicinity of the deflection element 140 or in the vicinity of the objective 120, it is possible to realize different illumination angles by using different light sources to illuminate the internal thread in each case.

It is understood that the method according to the invention and the device 100 according to the invention can be calibrated on the basis of thread standards. To this end, workpieces with a plurality of precisely known internal threads are placed on the measurement table of a coordinate measuring apparatus 28 and the method according to the invention is carried out by means of the device according to the invention and the detected dimensions of the internal thread are calibrated on the basis of the known dimensions of the internal threads. To this end, the employed thread standards will differ in relation to the workpiece coordinate system in terms of the core diameter and the pitch, as well as the position and inclination thereof.

It is understood that the foregoing description is that of the preferred embodiments of the invention and that various changes and modifications may be made thereto without departing from the spirit and scope of the invention as defined in the appended claims.

What is claimed is:

1. A method of measuring an internal thread of a workpiece with a measuring arrangement including a coordinate measuring apparatus and a CCD sensor or a CMOS sensor, the method comprising the steps of:
    recording at least two images of a section (A) of the internal thread with the sensor with changing the recordation conditions for the at least two images; and,
    at least partially applying the data of the two recorded images to determine at least one of the following: the position, orientation, core diameter and pitch of the internal thread.

2. The method of claim 1, wherein the position, the orientation, the core diameter and the pitch of the internal thread are determined from the data of the at least two recorded images.

3. The method of claim 1, wherein the recording of a first one of the images is carried out with central perspective imaging and the recording of a second one of the images is carried out with telecentric imaging.

4. The method of claim 1, wherein the measuring arrangement includes optical assemblies responsible for the imaging onto the sensor; and, wherein the lateral position and/or the orientation of the optical assemblies to the interior thread for the recording of a first one of the images is changed relative to the lateral position and/or orientation of the sensor to the interior thread for the recording of a second one of the images.

5. The method of claim 1, wherein the measuring arrangement further includes an illuminating device for illuminating the internal thread, the method comprising the further steps of:
    illuminating the internal thread with the illuminating device to record a section (A) of the internal thread;
    recording a first one of the images at a first illumination angle; and,
    recording a second one of the images at a second illumination angle different from the first illumination angle.

6. The method of claim 1, wherein the flank diameter of the internal thread is determined from the data of the at least two recorded images.

7. An arrangement for measuring an internal thread of a workpiece, the arrangement comprising:
    a coordinate measuring apparatus;
    an optical assembly including a CCD sensor or a CMOS sensor; an objective; and, an optical deflecting element configured so as to permit introduction thereof into said internal thread and to be moved therealong;
    said objective and said optical deflecting element being arranged so as to coact to image a section (A) of the internal thread onto said sensor; and,
    said objective being configured to change perspective for the recordation of at least two images of said section (A) of the internal thread by said sensor.

8. The arrangement of claim 7, wherein the recordation of a first one of said at least two images takes place with a central perspective imaging of said objective and the recordation of a second one of said at least two images takes place with telecentric imaging of said objective.

9. The arrangement of claim 7, further comprising an illuminating device for directing an illuminating light onto a section (A) of said internal thread under consideration; and, said illuminating device is configured to change the angle at which said illuminating light impinges on said section (A) for the illumination for the recordation of said at least two images of said section (A) of said internal thread.

10. The arrangement of claim 9, wherein said illuminating device includes at least one light source in the vicinity of said objective; said at least one light source is configured to change the lateral position and/or orientation to said objective for adjusting different illuminating angles of said section (A) to be considered.

11. The arrangement of claim 9, wherein said illuminating device includes several light sources in the vicinity of said objective; and, said light sources are arranged so as to permit different illuminating angles of said section (A) of said internal thread under consideration to be set utilizing correspondingly different ones of said light sources.

12. The arrangement of claim 9, wherein said illuminating device includes several light sources in the vicinity of said deflecting element; said light sources are so configured that they can be introduced with said deflecting element into said internal thread; and, different ones of said light sources are arranged so as to permit a setting of different illuminating angles of said section (A) of said internal thread.

* * * * *